United States Patent [19]

Brill et al.

[11] 4,143,382
[45] Mar. 6, 1979

[54] BATTERY OPERATED ELECTRONIC ALPHANUMERIC PERMANENT RECORDING INSTRUMENT, SUCH AS RECORDING POCKET CALCULATOR

[75] Inventors: Klaus Brill, Korntal; Kurt Hurst, Stuttgart; Manfred Köder, Gerlingen, all of Fed. Rep. of Germany

[73] Assignee: Robert Bosch GmbH, Stuttgart, Fed. Rep. of Germany

[21] Appl. No.: 776,853

[22] Filed: Mar. 11, 1977

[30] Foreign Application Priority Data

Mar. 16, 1976 [DE] Fed. Rep. of Germany ....... 2610936

[51] Int. Cl.² .................. G01D 15/10; G01D 9/00
[52] U.S. Cl. ................................. 346/76 R; 346/17
[58] Field of Search ........................... 346/76 R, 17

[56] References Cited

U.S. PATENT DOCUMENTS

| 3,754,278 | 8/1973 | Borden, Jr. ................... 346/76 R |
| 3,845,850 | 11/1974 | Herr et al. ................... 346/76 R X |
| 3,879,738 | 4/1975 | Riedl .............................. 346/76 R |
| 3,916,420 | 10/1975 | Brown et al. ................. 346/76 R X |
| 3,973,111 | 8/1976 | Washizuka et al. ........... 346/76 R X |

FOREIGN PATENT DOCUMENTS

1298332 6/1969 Fed. Rep. of Germany.
2026792 12/1970 Fed. Rep. of Germany.
2434626 2/1975 Fed. Rep. of Germany.

Primary Examiner—George H. Miller, Jr.
Attorney, Agent, or Firm—Flynn & Frishauf

[57] ABSTRACT

A strip of recording paper on which a metallization is formed on a paper substrate, which metallization is burned off under the influence of an electrical discharge is passed beneath a recording head. In one embodiment, the recording head is moved transversely across the recording paper, while in engagement with a group of contact tracks which are, selectively, energized in accordance with the desired alphanumeric output. The recording head is formed with point contact electrodes and line-contact electrodes. The alphanumeric output is displayed on the instrument in segmental form and when a segment is to be printed in the direction transverse to the relative direction of movement of the head and the paper, the line-contact electrode is momentarily energized to cause printing of a line; if a segment is to be printed which extends in the direction of relative movement of the head and the paper, a point contact segment is energized for a distance corresponding to the distance of the segment to be formed. The recording head may be moved with respect to the paper, the paper being held stationary during recording, for example transversely across the recording paper, and then returned to a starting position; or, the recording head may be formed as a group of two point contact electrodes and one line-contact electrode between the point contact electrodes, one such group for each digit to be recorded, with the paper fed for example over a platen and moved with respect to the stationary recording elements, feed of the paper beneath energized point contact electrodes causing segmental lines in the direction of feed, and momentary energization of the line-contact electrode causing a transverse line connecting the two lateral lines formed by the point contact electrode to thereby generate alphanumeric characters in a 7-segment code.

36 Claims, 9 Drawing Figures

BATTERY OPERATED ELECTRONIC ALPHANUMERIC PERMANENT RECORDING INSTRUMENT, SUCH AS RECORDING POCKET CALCULATOR

CROSS REFERENCE TO RELATED PATENT

Reichle et al, U.S. Pat. No. 3,995,083, assigned to the assignee of the present invention.

The present invention relates to electronic instruments of the miniature type adapted for portable, battery operated use and of a size to fit conveniently into the pocket of a user which, nevertheless, has recording capability functions.

The present invention is particularly adapted to pocket calculators of the hand-held type, but not restricted thereto; it is similarly applicable to electronic testing and measuring instruments which also have to have recording function. Basically, the present invention is directed to providing a permanent record of displayed alphanumeric characters or symbols, and more especially of the seven-segment type. Usually these displays are instrumented by light emitting diodes (LEDs), liquid crystals, or the like, arranged in seven segments, from which the numerals 0 to 9 can be generated, as well as selected alphabetical characters. The present invention can be permanently associated with such an instrument, or attached thereto as an accessory, electrically controlled by an output cable from output signals readily available at the calculator or instrument, and controlling the illumination of the display in the segmental form. The invention, additionally, relates to recording heads and systems in which the recording heads, although recording seven-segmental alphanumerical symbols are formed with a lesser number of actual recording elements or recording surfaces.

Usually, electronic instruments of the type to which the invention relates, and particularly calculators display the result of calculations by LED segmental readout panels. The instantaneous result is thereby indicated. It is possible to store intermediate results, subtotals, and the like in various pocket calculators for later processing, and recall in selected addresses. The indication at the display panel, however, is always that of the instantaneous value, or the instantaneous input and finally only the end result is available. This end result no longer provides information regarding the type and scope of the previously carried out calculating process, it does not previously obtained subtotals or intermediate results, and does not show what parameters or inputs were added to the initial input to obtain the finally indicated output.

Pocket calculators, as well as other instruments may include in their circuit outputs not only for the segmentally arranged LEDs, which provide the segments for the alphanumeric characters to be displayed; they may, additionally, have outputs for special indicia such as decimal points and the like. The outputs of these instruments correspond to the possible number of digits of the instrument which can be displayed or, rather, for the segments of the number of digits which can be displayed. A particular result is then indicated by starting a clock generator which sequentially scans the outputs of the selected number to be displayed, one after the other, and, at each particular digit, commands application of the respective voltages for the respective LEDs of the respective segments which correspond to the particular alphanumeric character to be displayed at a particular digital position.

Printout-type electronic calculators have been proposed which include a printing station, which is provided in addition to the luminecent display, or which can be coupled thereto. Such printout-type calculators permit recording of intermediate results, possibly newly added detail and the like on a continuous paper strip. These types of calculators are usually desk models of substantial size, requiring for operation of the printing system a larger amount of power than usually available by battery, and therefore either requiring a separate substantial rechargeable battery supply, or a power connection; essentially, they are heavy and not suitable for easily portable, or pocket use. They usually are supplied by commercial line power.

Some of the printing output systems which have been proposed use a recording arrangement emplyoing metallized paper. This system uses paper on which a very thin coating of metal is applied, typically by evaporation, and on which numbers or other alphanumeric symbols of characters are recorded by relatively insulated recording electrodes by passing a current between the respective electrode corresponding to a number or sign and a counterelectrode which is in electrical contact with the metal on the paper. The metal on the paper is burned off at the contact point between the writing electrode of the recording head and the recording paper.

Desk model calculators usually cannot be carried about by the user due to their weight and the requirement of a line power connection. Pocket calculators, however, which can readily be carried by the user previously did not permit the recording of outputs and inputs to the calculator due to the heavy use of power and weight of the recording apparatus.

It is an object of the present invention to provide an electronic alphanumeric permanent recording instrument which is designed for display of data by alphanumeric, segmental representation of digits, and which is sufficiently small and light and has sufficiently low power consumption so that the overall instrument is portable, and hardly larger, or heavier than the instrument itself without the recording feature; as an additional object, the recording element itself can be an accessory to the instrument, preferably so arranged that the instrument can be permanently located thereon and be electrically connected thereto.

SUBJECT MATTER OF THE PRESENT INVENTION

Briefly, a housing is provided which forms a storage compartment to hold elongated recording paper, for example in zig-zag fold, as separate strips, in a roll, or the like. The recording paper is fed through a removal slot upon withdrawal of the paper from the storage compartment. A recording head, including a plurality of respectively mutually insulated recording electrodes is provided and located in recording relationship to the recording paper when the paper is removed from the slot. The recording head and the paper are relatively movable, for example by permitting transverse sliding of the recording head. Upon such transverse sliding operation, the respective recording electrodes, corresponding to segments of a luminescent display are energized as the recording head passes physically the positions representing digital positions of the data represented by the segmental LEDs of the instrument. The recording head, therefore, will reproduce on the paper the same output symbols, in the similar segmental form as the segmental alphanumeric representation of the display of the instrument.

Preferably, the contacts are effected by contact tracks secured to the housing and permitting relative movement between the recording head and the housing.

If the particular segment to be displayed is horizontal — (for example the uppermost and lowermost lines of a zero), then the recording head need not have a physical segment in the position, but a point contact of the recording head is sufficient, energization of the recording head being sufficiently long so that transverse relative movement between the recording head and the paper will draw a line, representing the horizontal segment of the 0 display.

Using metallized paper recording permits additionally providing a record of the data displayed by the instrument even in such a small instrument as a pocket calculator, without substantially increasing the size and weight thereof. It is only necessary to provide additional space for a suitable supply of paper, space for a recording head and for a paper feed arrangement. Such additional apparatus can readily be constructed in the order of size of the customary housing of a pocket calculator. The energy supply for the recording system can be furnished by the battery, already in use for the calculator itself, or by a small additional battery. The power capabilities of currently available batteries are sufficient to permit recording on metallized recording paper.

It is therefore possible to additionally improve pocket calculators and other alphanumeric electronic data representing instruments, designed for hand-held, or immediately portable use by a printing arrangement, energized by the same type and size of battery as that which is used for the pocket calculators themselves. The printing arrangement is simple and effective and requires but little space, energy, and has low weight. It is simple in operation and handy and permits selection of printout of any desired data which are being displayed on the instrument. The printing arrangement can be constructed to be inexpensive and reliable in use and permits matching of the output to various types of symbols, signs and characters, and thus complete matching of the output of the type of indication available from the electronic instruments with which it is to be used.

The metallized paper can be supplied in roll form or flat. If flat, the entire arrangement will become planar, and is particularly adapted to fit against the housing of a pocket calculator.

The relative movement between the metallized recording paper and the recording head can be carried out by means of electrical drives, as any one of the displayed data are to be recorded. In order to obtain, however, a particularly space saving and simple arrangement for the recording system, a preferred form effects relative movement between the metallized paper and the recording head by means of a lever, that is, by hand operation. This also substantially decreases the power consumption of the recording system, unit, or attachment.

In accordance with an embodiment of the invention, a recording head is moved transversely to the feed direction of the metallized paper, that is, over the width of the line from left to right, and back. In its movement in one direction, recording of the symbols is effected; in its return movement, the recording paper is fed by one line to the ready position to record the next line. Preferably, the feed of the recording paper is effected by the return of the recording head after recording. The recording head is preferably slidably retained in a wall, or against a plate on which the contact tracks are likewise secured.

The present invention is not limited to the seven-segmental form of alphanumeric representation. Other types of symbols can be used, and, preferably, the recording or writing head can be so made that it is readily interchangeable with a head arranged for a different type of indicia.

An essentially rectangular housing (1, 2) of a usual type of pocket, or hand calculator has a compartment 2 to include the electronics of the calculator. The data entered, or calculated are displayed by light emitting diodes (LEDs), or liquid crystals (LC) or other similar displays. Pushbutton 3 permit input to the calculator. Battery spaces 4, 5 are provided to receive batteries to operate the calculator.

A front end (left side of FIG. 1) of the housing holds the recording arrangement for the calculator. This recording arrangement may be integral with the housing of the calculator, or may be separate to form an attachment thereto. The recording arrangement operates by burning off a metal coating, typically an evaporated metal coating on a paper substrate. Supply of new paper for recording is in form of a stack 6 of new recording paper located in the bottom portion of the housing 1. Single sheets 7 which, if desired, may be folded in zig-zag form are fed through a slit 8 formed in the housing, in order to obtain the recorded data which were displayed on the calculator, be they input data, intermediate results, end results, or the like.

The recording system is seen in greater detail in FIGS. 3 to 8.

Figures 1, 2:
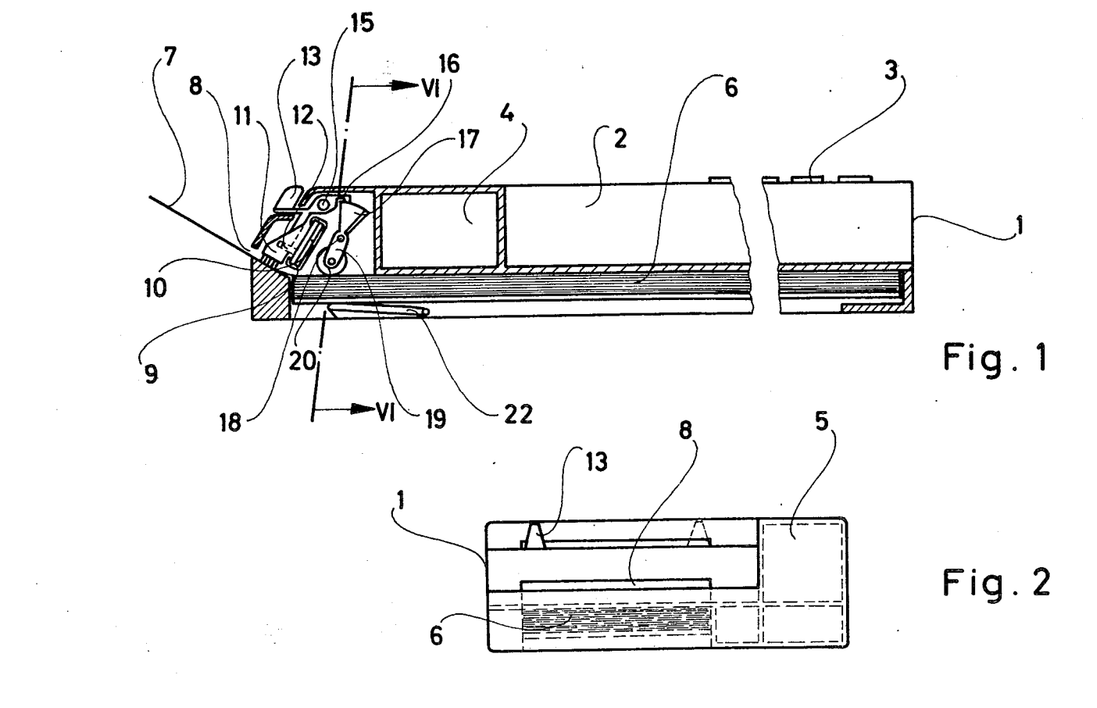
FIG. 1 is a vertical part sectional view of a recording-type hand, or pocket calculator.
FIG. 2 is a front view of the calculator, that is, of the left side of FIG. 1.
Figure 3:
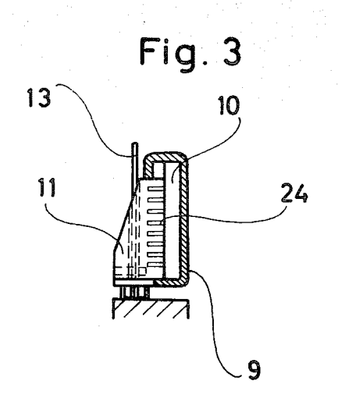
FIG. 3 is a fragmentary portion of the forward part of the calculator of FIG. 1, to enlarged scale and partly in section.
Figure 4:
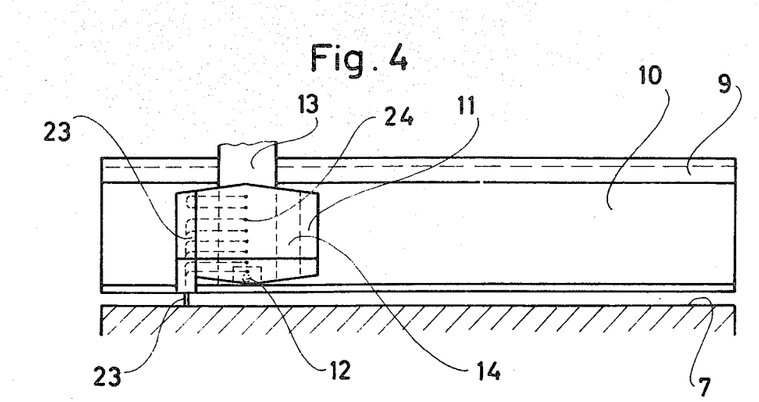
FIG. 4 is a left side view of the fragmentary element of FIG. 3, and also illustrating portions of the front of the calculator, to an enlarged scale.
Figure 5:
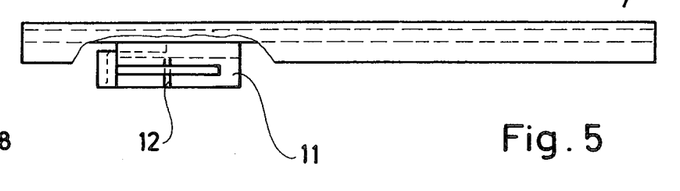
FIG. 5 is a top view of the element of FIG. 3.
Figure 6:
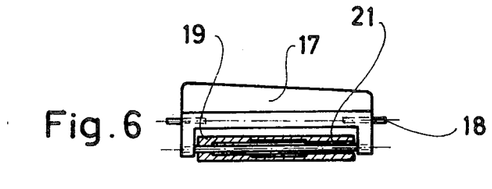
FIG. 6 is a fragmentary sectional view of a portion of the calculator, taken along line VI—VI of FIG. 1.
Figure 7:
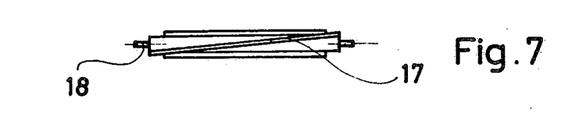
FIG. 7 is a top view of the element of FIG. 6.

Vertically arranged with respect to FIG. 1, and suitably secured to housing 1 is a C-shaped holding rail 9 (FIG. 3), in which a plate 10 of insulating material is secured. The rail 9 is attached or secured to the housing by means (not shown) for example rivets, interlocking extrusion, adhesion, or the like. Contact tracks formed on the insulating plate 10 face the open side of the C-shaped rail 9. A recording head 11 is formed with slider contacts which are in frictional, and wiping contact engagement with the contact tracks. The recording head 11 is secured on a shaft 12. It is pivotally connected thereto, to pivot, within small limits in a direction towards and away from the metallized paper 3. The shaft 12 is secured to an extension 13 in which forms a hand lever. The extension 13 extends through an opening 14 which defines and limits the pivoting movement of the recording head.

The lever 13 is guided on a rod 15 which extends transversely of the recording paper, that is, transversely to the plane of the drawing of FIG. 1. Lever 13 is formed with a short groove 16, likewise extending in the direction transverse to plane of the drawing of FIG. 1. A spiraled surface 17, extending over the width of the recording paper 7 engages in the groove 16 of the handle 13. Spiral surface 17 (FIGS. 6, 7) is part of the holder 20 which is rotatable over a shaft 18 and holds the feed roller 19 for the recording paper. With respect to the feed roller 19, the spiral surface 17 is located at the other side of the pivot axis 18, that is, at the top side in FIG. 6.

A one-way cluth 21 (FIG. 6) insures that the feed roller 19 can turn only in the direction of feed movement for the paper, that is, outwardly of the slit 8. The stack 6 of recording paper is pressed upwardly, and in contact with the feed roller 19 by a spring 22.

Operation of feed mechanism: Upon movement of lever 13 in the direction transverse to the width of the recording paper 7, that is, in and out of the plane of the drawing of FIG. 1, writing or recording head 11 is likewise moved along with it. In FIG. 2, movement would be from the left towards the right. The holder 20 for the feed roller 19 is thereby pivoted about axis 18 in counterclockwise direction. Feed roller 19 can roll freely with respect to the recording paper 7. Upon return movement of lever 13 and, with it, recording head 11, holder 20 will pivot about axis 18 in clockwise direction. The feed roller 19 is now clamped by the one-way clutch 21 and prevented from free rotation, so that the uppermost sheet of recording paper 7 is moved through slit 8 by the distance of one writing line. Good frictional contact between the feed roller 19 and the recording paper 7 is insured by locating the spring 22, providing upward spring pressure, beneath, or approximately beneath the feed roller 19. The pivoting movement of the holder 20 upon reciprocating movement of the lever 13, of course, is caused by engagement of the spiral ridge or surface 17 in groove 16 of the roller unit.

Recording of data: The writing head 11 (FIG. 8) has a plurality of mutually insulated writing electrodes 23 which are in sliding, wiping contact by means of terminals 24 with tracks 25 on plate 10. Upon movement of the recording head 11 from left to right, with respect to FIG. 2 or 4, movement will result between the recording head and the recording paper at a time when the recording paper is stationary in the housing, that is, when it is held against movement, and is not fed by the feed roller 19. Upon such movement, the sliding contacts 24 are subjected to a torque in counterclockwise direction about shaft 12, pressing the writing electrodes 23 on the paper 7. Upon this movement of the lever 13, recording of the then displayed values in the calculator will be effected (as discussed below) or, other indicia then being displayed will be recorded. Upon return movement, that is, from right towards the left in FIGS. 2 and 4, the wiping contacts 24 will provide a torque which extends in clockwise direction, thus slightly tipping the writing head 11 in clockwise direction about the pivot axis 12 and lifting off the writing electrodes 23 from the metallized paper 7. The paper is fed during this movement for the next line, so that there will be no interference with longitudinal paper feed and the recording head can be returned without wear and tear, or abrasion on the writing electrodes 23.

Figure 8:
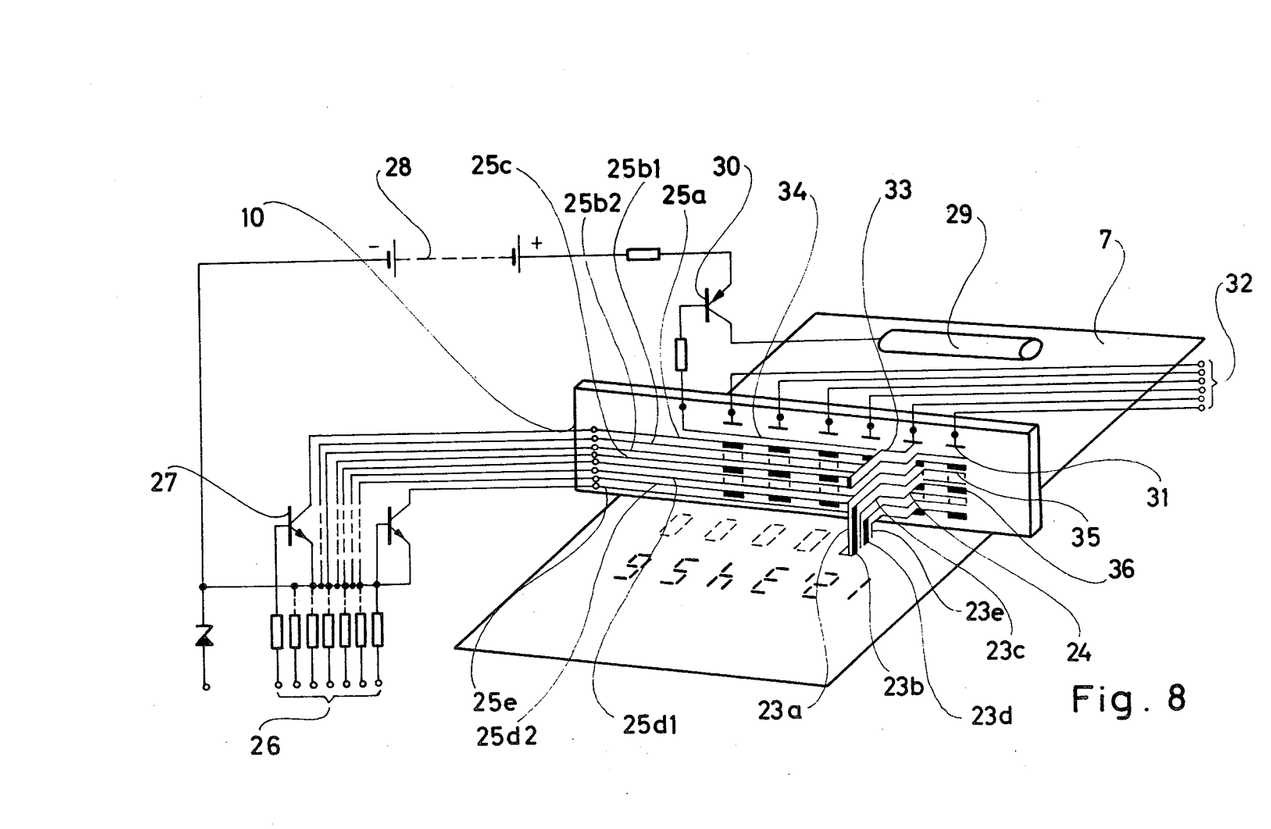
FIG. 8 is a fragmentary and simplified perspective representation of the recording unit of FIG. 1, with circuit elements shown separately to facilitate explanation of the operation of the system.

A simplified schematic showing of the arrangement is reproduced in FIG. 8 in which plate 10 is shown, with contact tracks 25a, 25b1, 25b2, 25c, 25d1, 25d2 and 25e. Writing or recording electrodes 23a, 23b, 23c, 23e are shown which are in sliding or wiping connection by means of wiping contacts collectively shown at 24 with the respective contact tracks. The contact tracks, as illustrated, are matched to record the well known 7-segment alphanumeric representation. They are connected in suitable manner to the segmental outputs 26 from the instrument. Suitable amplifiers, of which only two are shown in detail, are interposed between the outputs 26 and the recording tracks to provide power to the contact tracks 25 and thus to the writing electrodes 23, derived from a battery 28. The power current flows over the metallic coating of metallized paper 7 to a counter electrode 29 which is connected to battery 28 by means of a control transistor 30. Connection of the transistor 30 is effected by contacts 31 located, physically, on the plate 10 at positions corresponding to the respective digits of the instruments. The respective contact positions 31 are suitably connected to the digit display selection output terminals 32 of the instrument, typically the pocket calculator. A connecting bridge 33 on the recording head connects the respective digital position terminal 31 and a track 34 on plate 10.

Upon movement of the recording electrodes 23 from left to right (FIG. 8) on plate 10, the respective terminal 24 will pass the regions associated with the various digital positions of the display of the calculator. Controlled by a clock generator, voltages will be applied to the contact positions 31 of the calculator as well as to the segmental ouputs 26 thereof, or will be absent, in dependence with the respective display which is commanded. If one of the contact positions 31 is energized, transistor 30 will become conductive and power current can flow from battery 28 through the writing electrode 23 to the counter electrode 29. This causes the metal coating of the paper 10 to burn off at the respective writing electrode, thus generating the respective character.

In accordance with a feature of the invention, the contact tracks 25 and the recording electrodes 23 are so arranged that for 7 segments of alphanumeric characters 7 contact tracks 25 are provided, but only 5 recording electrodes 23 are necessary. This can be obtained by forming the segments which extend in the direction of the feed of the recording paper, that is, transversely to the width thereof, by providing electrodes in the form of longitudinal writing edges 23b or 23d. These writing edges 23b, 23d have a length which corresponds to the segments. They are, respectively, connected to the contact tracks 25b1, 25b2 and 25d1 and 25d2 upon movement of the recording head from left to right. They, therefore, record both the forward as well as the rear segments, in the feed direction of the recording paper. The contact tracks 25b1, 25b2 and 25d1, 25d2 are formed with contact positions 35 extending transversely to the direction of movement of the recording head.

These contact points are narrow, so that the entire edge is energized only momentarily, forming an extended longitudinal line, corresponding to the respective line segment. The recording electrodes 23a, 23c and 23e generate the segments which extend transversely to the feed direction of the recording paper 7. Thus, corresponding respective contact tracks 25a, 25c and 25e have corresponding contact positions 36 extending transversely to the feed direction of the metallic recording paper 7.

The writing electrodes 23b and 23d are thus used twice in selected alphanumerical characters, for example, when writing an 8, a 0, a 6, or the like. For a 7-segment display, two recording electrodes can be saved, which simplifies the recording head and permits a smaller size thereof.

Figure 9:
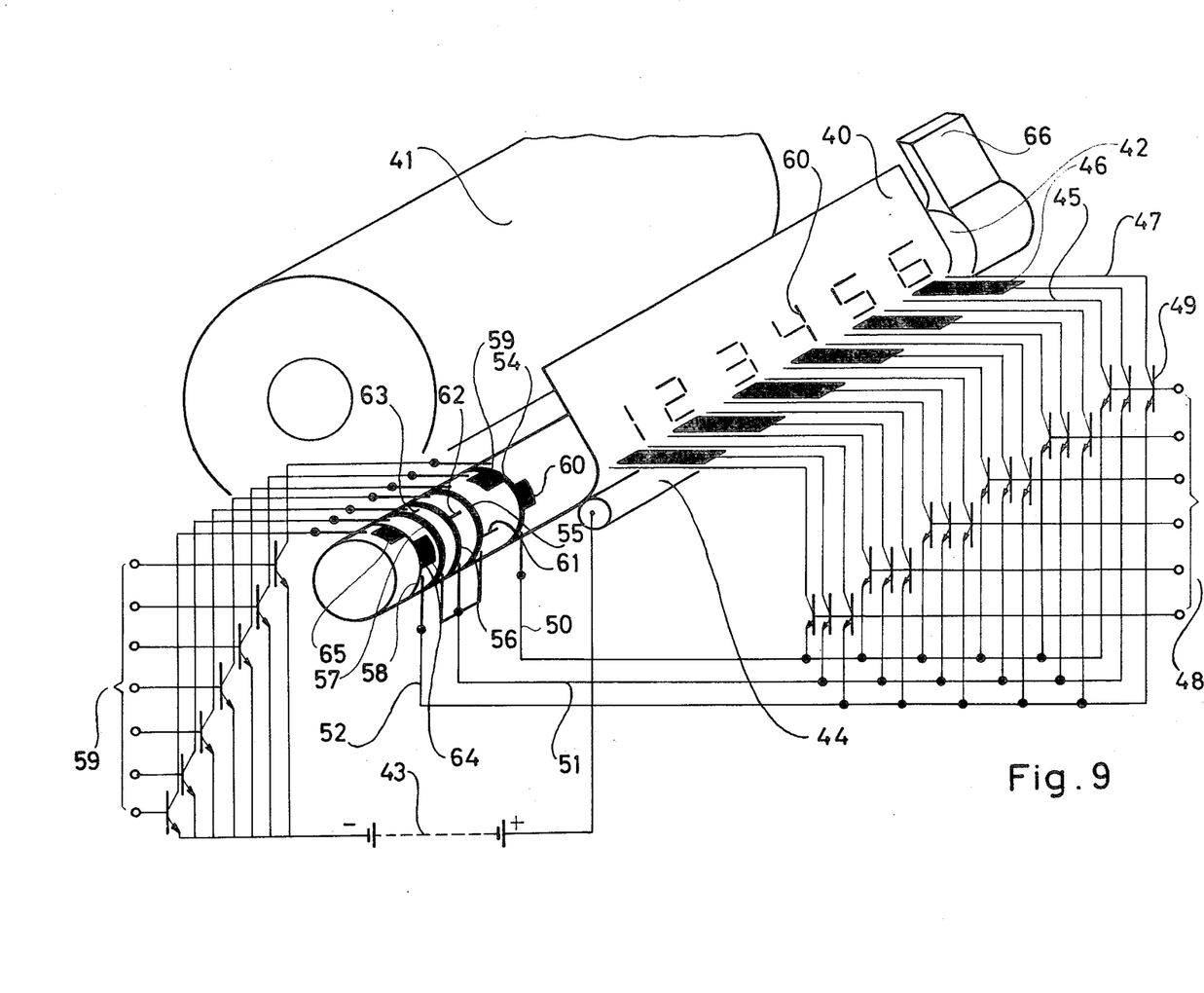
FIG. 9 is a simplified partially perspective view of another embodiment of the recording system, additionally showing wiring therefor, and arranged to permit explanation of another embodiment in accordance with the present invention.

FIG. 9 illustrates another embodiment of a recording system in simplified representation. Recording paper 40 is derived from a supply roll 41 and taken off by a feed roller 42 which can be rotated by a hand lever 66 in steps similarly to a stepped, indexed rotation of a typewriter feed roller, for example, to provide line-by-line feed of the paper. The recording paper 40 is connected between the feed roller 42 and a counter electrode 44 connected to the battery 43. Any one alphanumeric character has 3 recording electrodes 45, 46, 47 associated therewith. This permits a 7-segmental representation. The recording electrodes 46 are formed with a recording edge to generate the segemtns extending transversely to the feed direction of the recording paper 40. The recording edge corresponds to the length of the segments of the segmental alphanumeric characters.

This arrangement has the advantage that for a 7-segment representation, only three recording electrodes are needed, although the 3 recording electrodes must be present at any one digital output position.

The recording electrodes are controlled by switching transistors 49 which, in turn, are controlled from the outputs 48 from the display of the calculator. In accordance with energization of the respective amplifying transistors 49, a circuit to the contacts 50, 51, 52 is completed by contacts which are in sliding engagement with contact tracks 54, 55, 56, 57, 58. The sliding contacts 54 to 58 are connected to the segmental outputs 59 of the calculator. Thus, energization of the respective amplifyer 49 from output 48 commands which digit is to be recorded; the outputs 59 control, through a respective amplifying transistor shown only schematically, the value of the digit to be recorded. The arrangement is so made that for the digits 60', looked at from left towards right in FIG. 9, the left segments are recorded by recording electrodes 45. Recording electrodes 45 are controlled by contact positions 59, 60 extending in circumferential direction on the roller 42 and formed on the contact track 54. The recording electrodes 46 are controlled by axially extending contact positions 61, 62, 63 of the contact tracks 55 to 57, in order to control the 3 segmental outputs 59 when they come in contact therewith, commanding, at respective circumferential position, a horizontal bar to be recorded in accordance with the extended segmental position of the respective electrode 46. The electrodes 47 are controlled by circumferentially extended contact bars 64, 65 formed on the roller 42 and connected to the contact track 58 and forming the right segments — in the direction of the feed of the paper, as commanded by the corresponding segmental output 59 of the calculator.

The system can be easily battery operated, since a battery voltage of is sufficient to effect recording on recording paper, for example of the type described in U.S. Pat. No. 3,995,083, Reichle et al. Rather than using battery operation, the system can, of course, also be connected to a network and used, with or without a network adapter in connection with, or without rechargeable battery, that is, for network operation while a rechargeable battery is being recharged.

The apparatus in accordance with the present invention can be integrally connected to a calculator or other instruments, or can be electrically connected thereto and be associated with an attachment, or additional housing in which the instrument is snapped in. The use of a small lever 13 or 66, respectively, manually, decreases power supply and simplifies the apparatus. In accordance with the embodiment of FIGS. 1-8, the recording head is moved transversely across the paper and upon movement in one direction, the displayed data are recorded on the recording paper; upon return movement, the recording paper is fed forwardly by a distance corresponding to the just recorded line, thus feeding out the recorded line from the housing of the apparatus and rendering it visible. No special room is required for separate recording drive and for the feed apparatus, since the entire system can be combined in a small housing.

By arranging the recording head to be guided at a wall, or plate in such a way that it is slightly pivotable, within narrow limits, sliding contacts can be arranged and have long life and reliable connection since good sliding connection or frictional connection can be effected between contact tracks and the writing head during recording movement, since the recording movement can be so arranged that the torque in the recording direction is effective to provide for good engagement of the recording head with the recording paper as well as for good electrical contact between the sliding contacts on the recording head and fixed recording tracks. By lifting off the recording head upon return, however, wear and tear on the recording head is decreased. Thus, the recording head is pressed against the recording paper only during the recording movement, when actual recording is to be affected; the torque in the return movement, however, tends to lift off the recording head from the paper. This additionally facilitates return movement of the recording head and feed of the paper by a line, while additionally preventing interference between the feed movement of the paper while the recording head is in engagement with the paper.

Multiple use of the same recording electrode simplifies the recording head and permits its miniaturization. The overall structure thus can be made so small that it hardly increases the size of an average hand-held pocket calculator. This is obtained by shaping the segments of the recording electrodes differently, depending upon whether they are in alignment with the direction of relative movement between recording head and paper, or transverse thereto. The recording electrodes which extend transverse the direction of movement may merely be point shaped, having point contact or recording points in engagement with the recording paper, since the line which is being recorded is effectively generated by continuous energization of the recording point as the recording point and the paper effect relative movement. The contact connections, that is, the sliding contacts controlling energization of the contact points then will extend in the direction of movement of the contact head for a length corresponding to the length of the segment to be recorded by the point as it moves over the recording paper. Recording segments, which, however, are in alignment with the direction of relative movement are shaped to have an extent responding to the length of a segment, this electrode being energized momentarily when the paper and the electrode are in the corresponding relative position to generate a commanded alphanumeric character.

As a result of the multiple use, and the different shape of the recording electrodes, a 7-segmental alphanumeric representation requires only 5, rather than 7 recording electrodes if movement of the recording head is left-to-right with respect to paper fed transversely thereto, permitting location of a recording head in the smallest possible space. For example, if such a recording arrangement is used to record a 8, then, in course of the relative movement of the recording head, first all 5 electrodes are energized; the 3 electrodes with point-contact engagement with the recording paper continue to be effective to draw the 3 horizontal lines of the segmental 8 and at the termination of the formation of the character, all five electrodes are again energized. In this case, therefore, the electrodes which form the longitudinal edges are used twice, once at the beginning of recording, the second time towards the end thereof. The contacts of the contacts tracks are so arranged, therefore, that the segmental electrodes are momentarily contacted twice.

Relative movement can be obtained differently, however, and is shown in FIG. 9 in which the recording head is comb-shaped and extends towards the recording paper which is rolled off a platen roll 42. The recording head is stationary, while the recording paper moves, in steps, or smoothly. The recording paper is movable with respect to the free edges of the recording electrodes which face the platen, or transport roller. The platen or transport roller is somewhat extended and the extension and the contact tracks located thereon, are best seen in FIG. 9. Recording, again, is effected during relative movement the recording paper with respect to the recording head, and in this instance during feed of the paper. Feed of the paper is controlled by lever 66, controlling rotation of the transport platen. The lever 66 is preferably connnected to the platen by a one-way clutch so that return movement of the lever 66 does not cause any movement of the platen, that is, the platen is moved in feed direction only regardless of direction of movement of the lever 66. This can readily be instrumented by a return spring, and release clutch connection between lever 66 and platen 42, similarly to a typewriter platen control. This arrangement permits use of writing electrodes with point contact engagements 45, 47, connected to contact tracks which have a circumferential extent with respect to the transport platen, that is, have a length corresponding to the length of the segments to be recorded. These segments are connected to the segmental outputs of the calculator, or other instruments which control the longitudinal segments of the respective alphanumeric character. One other electrode is needed, which has a recording edge. Electrode 45 has an edge corresponding to the horizontal extent (with respect to FIG. 9) of the respective segment, and is energized momentarily when the recording paper and the electrode 45 is at a relative circumferential alignment to form the respective character segment. Again, the longitudinal length of the segment and the longitudinal length of the writing edge are matched. The contact tracks for the edge-shaped electrodes 45 are thin contact lines 61, 62 (FIG. 9) extending parallel to the axis of the transport platen and connected to suitable output terminals to generated the respective segments, as commanded by the digits to be recorded, in accordance with the data displayed by the instrument.

As a result, a 7-segment data display for alphanumeric characters can be generated using only 3 recording electrodes; the two recording electrodes with point shaped contacts generate the segments in feed direction of the recording paper; the electrode with the recording edge generates the segments extending transversely to the feed direction of the recording paper, and writes, at the most, three segments of the alphanumeric character made up of seven segments. The segmental outputs of the calculator for the right or left vertical segments are applied to the contact tracks corresponding to the left and right side of the alphanumeric character which have circumferential extent and form the contact tracks for the slider contact which are connected to the point electrodes. The segmental outputs from the calculator controlling the horizontal segments are directed to line segments which are applied to one, two, or three contact tracks which come in momentary contact with the writing edge of the extending writing electrode 45. Thus, with a minimum of writing electrodes, alphanumeric displays can be recorded. The writing electrode can readily be located transversely to the feed direction of the recording paper in a single line.

Feed of the recording paper in accordance with the recording system of FIG. 9 is not restricted to a roll-type recording paper; any other feed arrangement, and type of paper may also be used. Nor is it necessary that the back up for the recording paper be cylindrical, that is, a platen 42, although this is the preferred form. The electrodes can also be in contact with the paper backed up by a flat surface, if care is taken to move the flat surface together with the paper to align the proper contacts and contact paths with the electrodes as the paper is moved therebeneath.

Various change and modifications may be made, and features described in connection with any one of the embodiments may be used with any of the other, within the scope of the inventive concept.

We claim:

1. Battery operated electronic alphanumeric permanent recording instrument particularly for association with a calculator comprising
   a housing;
   an optical readout panel arranged for segmental representation of alphanumeric characters including segmental illuminating means,
   means deriving control signals for illumination of selected illuminating means to form said alphanumeric characters
   storage means located on said housing and defining a storage compartment to hold elongated recording paper (7, 40) therein;
   a recording paper removing position (8) to effect withdrawal of recording paper from the storage compartment;
   a recording head (11) including a plurality of respectively mutually insulated recording electrodes (23a–23e; 45, 46, 47) and located in recording relationship to the recording paper;
   movement control means effecting relative movement between said recording head (11) and said recording paper (7, 40), recording being effected on said recording paper by said recording head during such relative movement;

and contact means (25a–25e, 54–58) coupled to at least some of the segmental illuminating means and energized in accordance with energization of said illuminting means by said control signals, said contact means being in electrical connection with said insulated writing electrodes to energize the writing electrodes in accordance with energization of the illuminating means.

2. Instrument according to claim 1 wherein the contact means comprises sliding, or wiping contacts (25a–25e; 54–58) interposed between the supply of electrical energy and the writing electrodes, the sliding contacts being energized in accordance with the energization of the illuminating means by said control signals.

3. Instrument according to claim 1 wherein the contact means comprises contact tracks (25a–25e; 54–58) and engaging slider contacts permitting relative movement between the recording paper and the recording head during energization of the recording head.

4. Instrument according to claim 1 wherein the recording paper (40) is in roll form (41) and located in form of a supply roll in said storage means.

5. Instrument according to claim 1 wherein said recording paper (7) is in form of a stack (6) of flat sheets located within the storage means of housing (1).

6. Instrument according to claim 1 wherein the movement control means comprises a manually operable lever (13, 66).

7. Instrument according to claim 1 wherein said recording head (11) is interchangeable with recording heads of different segmental consideration.

8. Instrument according to claim 1 wherein the recording paper removing position (8) of the housing comprises a slit (8) formed in the housing for removal of the paper therefrom, the recording head being located adjacent said slit.

9. Instrument according to claim 1 wherein the recording head comprises a plurality of recording positions, located alongside each other at the digital positions of the alphanumeric characters to be printed, said recording head being stationary with respect to the housing;

a movable transport surface (42) moving said recording paper (40) with respect to the recording electrodes (45–47) of the recording head;

and wherein the contact means (54–68) comprises movable contact tracks moving conjointly with said movable transport surface and electrically connected to the recording elements of the recording positions of the recording head, to effect recording by said elements on the recording paper as the recording paper is moved over the transport surface.

10. Instrument according to claim 9 wherein the movable transport surface (42) comprises a transport platen;

a manual lever (66) coupled to the transport platen and effecting rotary movement thereof;

and wherein the contact tracks (54–68) are coupled to the platen and in engagement with stationary sliding contacts and with the elements of the recording head to effect synchronized recording by said elements during respective movement of said paper over said platen with respect to the recording head.

11. Instrument according to claim 1 wherein, during recording, the recording paper (7) is stationary in the housing; and the writing head (11) is movable with respect to the housing;

guide means (9, 10) are provided guiding the writing head (11) for movable transversely across the recording paper (7), recording being affected during movement of the writing head in one direction.

12. Instrument according to claim 11 wherein a feed movement of the paper is effected during return movement of recording head (11) in a direction counter the recording movement direction.

13. Instrument according to claim 11 wherein the guide means comprises a plate (10) and wherein the contact means (25a–25e) comprises a plurality of contact tracks and sliding or wiping contacts on the writing head (11) in electrical engagement with the contact tracks.

14. Instrument according to claim 13 further comprising an additional contact (31) associated with the digital positions of the alphanumerical characters to be recorded, contact means (24) located on the recording head to effect contact therewith, and means (34; 30) controlling energization of the respective contact tracks (25a–25e), in accordance with said control signals, to energize respectvie contact tracks when the recording head is at positions corresponding to the digital position of said alphanumeric characters to be recorded.

15. Instrument according to claim 13 further comprising a pivot axis (12) securing the recording head (11) in the guide means and permitting limited pivotal movement thereof, the pivot axis (12) being located relative to the plate (10) to cause a torque to become effective between the recording head (11) and the recording paper (7) to engage the recording electrodes 23a–23e) on the recording head with the recording paper due to the sliding, frictional engagement of the contact tracks (25a–25e) with the recording head (11) upon relative movement of the recording head in the direction of recording movement.

16. Instrument according to claim 15 wherein the pivot axis (12), additionally is so located that, upon return movement of the recording head, a torque is exerted on the recording head tending to lift the recording head off the recording paper (7) by pivoting about said pivot axis by said limited extent.

17. Instrument according to claim 11 further comprising a feed roller (19) located transversely across the recording paper (7) and engaged by the recording head (11), the feed roller being coupled to said recording head by unidirectional coupling means permitting feeding movement of said feed roller only upon return movement of said recording head (11).

18. Instrument according to claim 17 further comprising spring means (22) located in the storage compartment and beneath said feed roller (19) to press the recording paper (7) into engagement with the feed roller (19).

19. Instrument according to claim 17 wherein the feed roller (19) is rotatable by one line feed and the unidirectional coupling means comprises a one-way clutch (21) permitting free movement of the feed roller during movement of the recording head with respect to the feed roller in one direction, but engagement of the feed roller and the recording head, and consequential engagement of the feed roller with the recording paper upon return movement of the recording head.

20. Instrument according to claim 19 further comprising a spiral interengaging projection-and recess means (16, 17) interengaging the recording head (11) and the feed roller (19), the unidirectional coupling means permitting free rolling movement of the feed roller with respect to the recording paper (7) when the recording head is moved in recording direction, and forced rotation of the feed roller, due to the engagement of said interengaging spiral coupling means, when the recording head is moved in reverse direction;

the circumferential spiral extent of said interengaging sprial coupling means corresponding to the distance of one line feed of said feed roller.

21. Instrument according to claim 1 wherein some of recording elements (23b, 23d, 46) are formed with a recording edge extending in a direction parallel to the relative direction of movement of the recording paper and the recording head to record, when momentarily energized, a line record corresponding to the length of the edge extending transverse to the direction of relative movement;

others of the recording elements (23a, 23c, 23e; 45, 47) are formed with recording points to record, when energized during relative movement of the recording paper and the recording head, a line record extending in the longitudinal direction of relative movement and corresponding in length to the distance of relative movement during energization;

and wherein the contact means (25a–25e) control application of momentary energy to said some of the recording elements to effect said line recording and further control application of energy to said others of the recording elements during relative movement of said other elements and said paper over a predetermined distance.

22. Instrument according to claim 21 wherein the predetermined distance corresponds to the length of a segment of an alphanumeric character extending in said longitudinal direction and the length of the recording edge corresponds to the length of a segment of an alphanumeric character extending in said transverse direction.

23. Instrument according to claim 21 wherein the contact means which control application of momentary energy comprises first contact tracks (25b1, 25b2, 25d1, 25d2) formed with narrow contact strips;

and a contact means which control application of energy for an extended period of time to said other recording elements comprise second contact tracks (25a, 25c, 25e) formed with extended contact bars.

24. Instrument according to claim 23 wherein a plurality of narrow contact strips are provided for each recording position at which a single alphanumeric character is to be recorded, each strip permitting recording of segmental portions of the respective alphanumeric character at a predetermined position along the width of the alphanumeric character and extending in said direction transverse to the direction of relative movement of the recording head (11) and the paper (7, 40).

25. Instrument according to claim 24 further comprising control (26, 27; 32, 33, 34; 59) connected to said control signals and controlling respective energization of the first contact tracks.

26. Instrument according to claim 24 wherein, during recording, the recording paper (7) is stationary, and said recording head (11) carrying said recording element is movable.

27. Instrument according to claim 24 wherein, during recording, said recording head (11) is stationary and the recording paper (40) is movable.

28. Instrument according to claim 24 wherein the recording head comprises a comb-like structure extending transversely to the direction of relative movement of the recording electrodes and the recording paper (40), the recording electrodes (45, 46, 47) being stationary;

transport means including a paper transport platen (42) moving the recording paper (40) in immediate contact with said recording electrodes;

the contact means 54–58) forming rotary, circuit contact tracks rotating in synchronism with rotational movement of said platen and slider contacts (50, 51, 52) engaging said contact track and connected to respective recording electrodes.

29. Instrument according to claim 28 wherein said platen (42) is formed with an axial extension located within the housing, said axial extension carrying said contact tracks (54–58) and being located adjacent the portion of the platen covered by said recording paper.

30. Instrument according to claim 28 wherein the comb-shape recording electrodes (45, 46, 47) comprise, for each recording position, at least one recording electrode (46) formed with a recording edge extending in parallel said platen, and at least one recording electrode formed with a recording point engaging the recording paper (40) on said platen (42);

the contact means comprise contact tracks (54–58) located on the platen at a portion free from said recording paper (42) and located circumferentially on the platen, contact strips (61, 62, 63) being in electrical contact with some of said contact tracks and extending axially therefrom and contact bars (59, 60, 64, 65) being in contact with others of said contact tracks and extending axially therefrom and for a substantial circumferential distance about the platen;

slider contacts engaging said strips, and bars, respectively, the sliders contact engaging the strips being connected to said recording electrodes having the recording edge, to be momentarily be energized thereby, and the slider contacts engaging said recording bars being connected to the recording elements having said recording points;

and connection means (59) connecting said contact tracks to the control signals from said instrument.

31. Recording head system in combination with a source of signals controlling visual representation of alphanumeric character in segmental form comprising a recording element holder (11) and having recording elements (23a–23e, 45–47) located thereon, to record alphanumerical character representations in segmental form on recording paper relatively movable with respect to said recording head upon energization of selected recording elements of said recording head;

some of the recording elements (23b, 23d; 46) being formed with a recording edge extending in the direction parallel to the relative direction of movement of the recording paper and the recording head to record, when momentarily energized, a transverse line record corresponding to the length of the edge extending transverse to the direction of relative movement between the recording head and said recording paper (7, 40);

others of the recording elements (23a, 23c, 23e; 45, 47) being formed with recording points to record, when energized for a longer period than said momentary energization, and during relative movement of the recording paper (7, 40) and the recording elements of the recording head (11), a longitudinal line record extending in longitudinal direction of relative movement corresponding in length to the distance of relative movement between the recording element and the recording paper (7, 40) during energization of the respective elements;

said recording elements being in form of a plurality of narrow contact strips for each recording position at which a single alphanumeric character is to be recorded, each strip permitting recording of segmental portions of the respective alphanumeric character at a predetermined position along the width of the alphanumeric character and extending in said direction transverse to the direction of relative movement of the recording head (11) and the paper (7, 40);

contact means (25a–25e) including first contact tracks (25b1, 25b2, 25d1, 25d2) formed with narrow contact strips to control application of momentary energy to said some of the recording elements to effect said line recording and further second contact tracks (25a, 25c, 25e) formed with extended contact bars to control application of energy for a longer period than said momentary application to further control application of energy to the others of said recording elements and during said relative movement of said others of said elements over a predetermined distance with respect to the recording paper (7, 40);

and control means (26, 27; 32, 33, 34; 59) connected to said signal source and controlling respective energization of said contact tracks.

32. System according to claim 31 wherein the predetermined distance corresponds to the length of a segment of an alphanumeric character extending in said longitudinal direction and the length of the recording edge corresponds to the length of a segment of an alphanumeric character extending in said transverse direction.

33. System according to claim 31 wherein the (25b1, 25b2, 25d1, 25d2; 61, 62, 63), include a plurality of contact tracks, one each for a segment of the alphanumeric character to be represented, and connection means effecting movable, sliding contact between said contact tracks and said some of the recording elements formed with a recording edge for momentary engagement with said contact tracks, said connection means and contact tracks being relatively located to permit energization of any one of said recording edges, sequentially, by more than one contact track to permit multiple use of said recording element to record a segmental line by instantaneous recording, at a plurality of positions, upon said relative movement of the recording head and the recording paper.

34. System according to claim 31 wherein the second contact tracks (25a, 25c, 25e; comprise a plurality of contact tracks 59, 60, 64, 65) and relatively movable sliding contact means in engagement with said contact tracks, said contact tracks being in the form of elongated bars to effect continuous sliding engagement for a predetermined period of time upon relative movement of said contact tracks and said contact means, and connection means from said point-formed contact elements (23a, 23c, 23e; 45, 47) to said connection means to provide for energization of said connection means for said time period and to cause recording of a line during relative movement of the recording head and the recording paper (7, 40), and wherein at least some of the contact tracks and the engaging connection means are relatively located to permit engagement of said connection means with more than one of said contact tracks to permit multiple use of the recording elements connected to said respective connection means.

35. Attachment to provide an alphanumeric permanent record of data displayed on an optical readout panel arranged for segmental presentation of alphanumeric characters, including segmental illuminating means of an electronic instrument comprising recording head system including a recording element holder (11) and having recording elements (23a–23e, 45–47) located thereon, to record alphanumerical character representations in segmental form on recording paper relatively movable with respect to said recording head upon energization of selected recording elements of said recording head;

some of the recording elements (23b, 23d; 46) being formed with a recording edge extending in the direction parallel to the relative direction of movement of the recording paper and the recording head to record, when momentarily energized, a line record corresponding to the length of the edge extending transverse to the direction of relative movement between the recording head and said recording paper (7, 40);

others of the recording elements (23a, 23c, 23e; 45, 47) being formed with recording points to record, when energized for a longer period than said momentary energization, and during relative movement of the recording paper (7, 40) and the recording elements of the recording head (11), a line record extending in longitudinal direction of relative movement corresponding in length to the distance of relative movement between the recording element and the recording paper (7, 40) during energization of the respective elements;

and further comprising contact means (25a–25e) controlling application of momentary energy to said some of the recording elements to effect said line recording and further to control application of energy for a longer period than said momentary application to further control application of energy to the others of said recording elements and during said relative movement of said others of said elements over a predetermined distance with respect to the recording paper (7, 40);

the electronic instrument having means to generate control signals for illumination of selected illuminating means to form said alphanumeric characters of said optic readout panel, further including means connecting said control signals to said contact means (25a–25e).

36. Attachment in accordance with claim 35 further comprising a housing; storage means located on said housing and defining a storage compartment to hold elongated recording paper, means feeding said recording paper to recording position with respect to said recording elements (23a–23e, 45–47);

and means physically associating said electronic instrument and said attachment.

* * * * *

UNITED STATES PATENT AND TRADEMARK OFFICE
CERTIFICATE OF CORRECTION

PATENT NO. : 4,143,382
DATED : March 6, 1979
INVENTOR(S) : Klaus Brill et al.

It is certified that error appears in the above-identified patent and that said Letters Patent are hereby corrected as shown below:

Claim 33, column 15, line 41 after "wherein the" insert -- first contact tracks --.

Claim 34, column 15, line 57 and 58 delete "comprise a plurality of contact tracks"

Claim 34, column 15, line 58, after "65)" insert -- comprise a plurality of contact tracks --.

Signed and Sealed this

Fourth Day of September 1979

[SEAL]

Attest:

LUTRELLE F. PARKER
Attesting Officer    Acting Commissioner of Patents and Trademarks